(12) United States Patent
Tseng et al.

(10) Patent No.: US 12,508,294 B2
(45) Date of Patent: Dec. 30, 2025

(54) SELF-ASSEMBLED NANOPARTICLE AND USE THEREOF FOR ANTI-ANGIOGENESIS

(71) Applicant: Taipei Medical University, Taipei (TW)

(72) Inventors: Ching-Li Tseng, Zhubei (TW); Yu-Wen Cheng, Zhubei (TW); Yu-Yi Wu, Zhubei (TW); Erh-Hsuan Hsieh, Zhubei (TW); Jia-Hua Liang, Zhubei (TW); Fan-Li Lin, Zhubei (TW)

(73) Assignee: TAIPEI MEDICAL UNIVERSITY, Taipei (TW)

( * ) Notice: Subject to any disclaimer, the term of this patent is extended or adjusted under 35 U.S.C. 154(b) by 0 days.

(21) Appl. No.: 17/815,195

(22) Filed: Jul. 26, 2022

(65) Prior Publication Data

US 2024/0033316 A1 Feb. 1, 2024

(30) Foreign Application Priority Data

Jul. 21, 2022 (AU) .................................. 2022206798

(51) Int. Cl.
| | | |
|---|---|---|
| A61K 38/05 | (2006.01) | |
| A61K 9/00 | (2006.01) | |
| A61K 9/51 | (2006.01) | |
| A61P 9/14 | (2006.01) | |
| A61P 27/02 | (2006.01) | |

(52) U.S. Cl.
CPC ............ *A61K 38/05* (2013.01); *A61K 9/0019* (2013.01); *A61K 9/0048* (2013.01); *A61K 9/5161* (2013.01); *A61P 9/14* (2018.01); *A61P 27/02* (2018.01)

(58) Field of Classification Search
CPC . A61P 27/02; A61P 9/14; A61K 38/05; A61K 9/5161; A61K 9/0019; A61K 9/0048
See application file for complete search history.

(56) References Cited

U.S. PATENT DOCUMENTS

2018/0055826 A1* 3/2018 Prossnitz ............. A61K 31/436

FOREIGN PATENT DOCUMENTS

| | | | | |
|---|---|---|---|---|
| CA | 2771564 A1 * | 7/2013 | ........... | A61K 31/192 |
| WO | 2007/135164 A1 | 11/2007 | | |
| WO | WO-2018136061 A1 * | 7/2018 | ............. | A61K 38/28 |

OTHER PUBLICATIONS

Jayakrishna Ambati, et al, Age-Related Macular Degeneration: Etiology, Pathogenesis, and Therapeutic Strategies, 48 Surv. Ophthalmol. 25 (Year: 2003).*
Yanyan Wang, et al, Recent Advance of Nanoparticle-Based Topical Drug Delivery to the Posterior Segment of the Eye, 15 Exp. Opin. Drug Del. 687 (Year: 2018).*
Hyuncheol Kim et al., Development Of An Optimized Nano-Sized Sirna Delivery System To The Retina, Investigative Ophthalmology & Visual Science, Apr. 2011, vol. 52, 428. doi:, Arvo Annual Meeting Abstract, Apr. 2011.
Zheng Q. et al., In situ scavenging of mitochondrial ROS by anti-oxidative MitoQ/hyaluronic acid nanoparticles for environment-induced dry eye disease therapy, Chemical Engineering Journal, 2020, vol. 398, article 125621, https://doi.org/10.1016/j.cej.2020.125621, website: https://www.sciencedirect.com/science/article/abs/pii/S1385894720317496?via%3Dihub, 2020.
Kim H. et al., Bioimaging and pulmonary applications of self-assembled Flt1 peptide-hyaluronic acid conjugate nanoparticles, Biomaterials, 2013, vol. 34, Issue 33, pp. 8478-8490, https://dx.doi.org/10.1016/j.biomaterials.2013.07.062, website: https://www.sciencedirect.com/science/article/abs/pii/S0142961213008600?via%3Dihub, 2013.
Alejandra Meza-Rios et al., Therapies Based on Nanoparticles for Eye Drug Delivery, Ophthalmol Ther (2020), vol. 9, pp. 401-414, May 7, 2020, https://doi.org/10.1007/s40123-020-00257-7, May 7, 2020.
Ki Young Choi et al., Self-assembled hyaluronic acid nanoparticles for active tumor targeting, Biomaterials, 2010, vol. 31, iss. 1, pp. 106-114, Elsevier Ltd., DOI: 10.1016/j. biomaterials.2009.09.030, Available online Sep. 26, 2009.

* cited by examiner

*Primary Examiner* — Sean M Basquill
(74) *Attorney, Agent, or Firm* — Winston Hsu

(57) ABSTRACT

Provided is a nanoparticle or a pharmaceutical composition including the same for treating or remitting a neovascularization or an angiogenesis in eye segments, and the nanoparticle includes a hyaluronic acid and a therapeutic peptide. Also provided is a method for inhibiting formation or growth of blood vessels by administration of the nanoparticle or the pharmaceutical composition of the present disclosure to a subject in need thereof.

16 Claims, 16 Drawing Sheets

SELF-ASSEMBLED NANOPARTICLE AND USE THEREOF FOR ANTI-ANGIOGENESIS

FIELD OF THE INVENTION

The present disclosure relates to a self-assembled nanoparticle and a use thereof for treating an angiogenesis-related disease or disorder, especially an ocular angiogenesis-related disease or disorder.

BACKGROUND

Ocular diseases such as age-related macular degeneration (AMD) are becoming more common worldwide since the increase of aging population and the display device overuse such as overusing mobile phones or laptops that raises risks of obtaining eye strain and resulting in an eye disorder. According to WHO's report in 2021, at least 2.2 billion people have vision impairment and around 200 millions of them suffer from moderate or severe vision impairment or blindness.

Feizi, S. et al. (Eye and Vision, 4(1): p. 28, 2017) has shown that corneal angiogenesis is critical in vision impairment and blindness. According to the statistics, around 1.4 million people develop corneal neovascularization every year, and 12% of them will subsequently lose their vision. Corneal angiogenesis is also a common complication of corneal infection. The prevalence of infectious keratitis reflects the overall situation of corneal angiogenesis around the world. About 15% (6 million people) of blindness all over the world are caused by chlamydia infection. Onchocerciasis infection is another leading cause of blindness due to corneal angiogenesis. About 270,000 cases of blindness have been caused by such infection and about 120 million people in the world are at risk of it. In the United States, it is estimated that about 500,000 cases are affected by herpetic keratitis. Wearing contact lens can also be a factor leading to corneal angiogenesis, especially the long-term wear of soft hydrogel lenses. It is estimated that 1.3% of the 9 million contact lens wearers have new corneal blood vessels. In addition, the repair process when the cornea is chemically damaged (such as varnish removers, dyes, acids and alkalis) can also cause corneal angiogenesis. In the United States, the prevalence of corneal angiogenesis caused by all types of chemicals is approximately 37,000 people.

In addition to corneal angiogenesis, the formation and growth of new blood vessels in the posterior segment of eye (e.g. choroid neovascularization, ChNV) is also a major cause for severe ocular disorders and loss of vision. Such conditions can happen in a variety of circumstances including within individuals having age-related macular degeneration (AMD), diabetic retinopathy (DR), and severe vision impairment, etc.

Currently, the first line therapeutic methodology for treating ocular diseases includes oral steroids and intravitreal injection. However, long-term steroid use may cause side effects such as weight gain, hypertension, elevated blood sugar, glaucoma, cataracts and gastrointestinal symptoms. Steroids also suppress the protective role of immune system and therefore increase risks of getting infection such as herpes simplex recurrence. For intravitreal injection, anti-vascular endothelium growth factors are commonly used. Frequent injection could result in complications such as endophthalmitis, hemorrhages, ocular hypertension, inflammation, cataracts and retinal detachments.

As such, treatments that are capable of effectively inhibiting new blood vessel formation while being able to provide drug existence in situ are well-needed and desirable.

SUMMARY OF THE INVENTION

An object of the present disclosure is to provide a self-assembled nanoparticle for inhibiting angiogenesis or neovascularization. Such nanoparticle can be used, for example, in eye disease and/or disorder treatments.

Another object of the present disclosure is to provide a method for preparing the aforementioned nanoparticle.

Yet another object of the present disclosure is to provide a composition comprising the nanoparticle provided herein, such as a pharmaceutical composition.

Yet another object of the present disclosure is to provide a composition for treating or remitting ocular angiogenesis comprising the nanoparticle provided herein, such as a pharmaceutical composition for remitting ocular angiogenesis.

Yet another object of the present disclosure is to provide a method for treating or ameliorating diseases or disorders related to ocular angiogenesis, such as AMD, comprising administering the nanoparticle provided herein or its composition to a subject in need thereof.

Yet another object of the present disclosure is to provide a use of the nanoparticle provided herein in the preparation of pharmaceutics.

To achieve the above objects, provided herein is a self-assembled nanoscale particle comprising hyaluronic acid (HA) and a therapeutic peptide. In some embodiments, the self-assembled nanoparticle provided herein encapsulates at least 70% w/w of the given amount of the therapeutic peptide, such as 70% w/w, 71% w/w, 72% w/w, 73% w/w, 74% w/w, 75% w/w, 76% w/w, 77% w/w, 78% w/w, 79% w/w, 80% w/w, 81% w/w, 82% w/w, 83% w/w, 84% w/w, 85% w/w, 86% w/w, 87% w/w, 88% w/w, 89% w/w, 90% w/w, 91% w/w, 92% w/w, 93% w/w, 94% w/w, 95% w/w, 96% w/w, 97% w/w, 98% w/w, 99% w/w, or more of the given amount of the therapeutic peptide. In some embodiments, the self-assembled nanoparticle provided herein to encapsulates about 70% to 99% w/w of the given amount of the therapeutic peptide, such as about 70% to 75%, about 75% to 80%, about 80% to 85%, about 85% to 90%, or about 95% to 99%, of the given amount of the therapeutic peptide.

In some embodiments, the size of the nanoparticle provided herein is about 100 to 400 nm, such as about 100 to 150, 150 to 200, 200 to 250, 250 to 300, 300 to 350, or 350 to 400 nm. In some embodiments, the size of the nanoparticle provided herein is about 150 to 350 nm. In some embodiments, the polydispersity index of the nanoparticles provided herein is about 0.001 to 0.7, such as about 0.001 to 0.01, about to 0.05, about 0.05 to 0.1, about 0.1 to 0.15, about 0.15 to 0.2, about 0.2 to 0.25, about 0.25 to 0.3, about 0.3 to 0.35, about 0.35 to 0.4, about 0.4 to 0.45, about 0.45 to 0.5, about 0.5 to 0.55, about 0.55 to 0.6, about 0.6 to 0.65, or about 0.65 to 0.07. In some embodiments, the zeta-potential of the nanoparticles provided herein is ranged from −40 mV to 40 mV, such as −40 mV to −35 mV, −35 mV to −30 mV, −30 mV to −25 mV, −25 mV to −20 mV, −20 mV to −15 mV, −15 mV to −10 mV, −10 mV to −5 mV, −5 mV to 0 mV, 0 mV to 5 mV, 5 mV to 10 mV, 10 mV to 15 mV, 15 mV to 20 mV, 20 mV to 25 mV, 25 mV to 30 mV, 30 mV to 35 mV, or 35 mV to 40 mV. In some embodiments, the zeta-potential of the nanoparticles provided herein is about −35 mV to 35 mV.

In some embodiments, the nanoparticle provided herein comprises a therapeutic peptide exhibiting an antioxidant, anti-inflammatory, and anti-angiogenesis property in vascular endothelial cells, in particular a property of inhibiting the generation of reactive oxygen species (ROS) and therefore suppressing the expression of vascular endothelial growth factor (VEGF). In some embodiments, the nanoparticle provided herein comprises a Nox2 targeted inhibitory peptide, such as a gp91 ds-tat peptide.

In some embodiments, provided herein is a method for inhibiting formation and/or growth of blood vessels, comprising administering the nanoparticle provided herein to an individual in need thereof. In some embodiments, the blood vessels are ocular blood vessels, where the nanoparticle is administered to the eye segment of an individual. In some embodiments, the eye segment comprises the anterior eye segment and the posterior eye segment, where the anterior eye segment includes cornea, conjunctiva, iris, and lens; the posterior eye segment includes the anterior hyaloid membrane, the vitreous humor, retina, optic nerve, choroid and sclera. In certain embodiments, the anterior eye segment refers to cornea. In certain embodiments, the posterior eye segment refers to retina and choroid.

In some embodiments, the nanoparticle is substantially positively charged (zeta potential>0 mV) and is administrated via eye drops to the anterior eye segment or the posterior eye segment of an individual in need thereof. In some embodiments, the nanoparticle is substantially negatively charged (zeta potential<0 mV) and is administrated via intravitreal injection to the posterior eye segment of an individual in need thereof. In some embodiments, the nanoparticle administrated to the posterior segment travels through the retina and reach the choroid.

In some embodiments, the individual suffers from an angiogenesis or neovascularization related disorders, such as solid tumor (e.g., carcinoma, sarcoma), angiofibroma, arteriovenous malformations, atherosclerosis, hemangiomatosis, vascular adhesions, dyschondroplasia with vascular hamartomas (Maffucci's syndrome), hereditary hemorrhagic telangiectasia (Osler-Weber-Rendu disease), inflammation, or aberrant wound healing.

In some embodiments, the individual suffers from an ocular angiogenesis-related disorder, such as age-related macular degeneration (AMD), retinal artery or vein occlusion, branch retinal vein occlusion, retinopathy of prematurity (ROP), neovascular glaucoma, corneal neovascularization (CoNV), diabetic macular edema (DME), acute idiopathic maculopathy, polypoidal choroidal vasculopathy, ischemic diabetic retinopathy, retinitis pigmentosa (RP), cone-rod dystrophy, Behcet's disease, proliferative vitreoretinopathy (PVR), retinitis, uveitis, Leber's hereditary optic neuropathy, retinal detachment, retinal pigment epithelium detachment, retinal angiogenesis and choroidal neovascularization (ChNV), posterior segment trauma, radiation retinopathy, epiretinal membrane, or anterior ischemic optic neuropathy.

In some embodiments, provided herein is a composition comprising the nanoparticle provided by the present disclosure.

Definition

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the descriptions of the present disclosure. Thus, the terms used herein are defined based on the meaning of the terms together with the descriptions throughout the specification.

As used herein, the term "a," "an," or "the" includes plural referents unless expressly and unequivocally limited to one referent. The term "or" is used interchangeably with the term "and/or" unless the context clearly indicates otherwise. The term "about" refers to an acceptable margin or deviation for a value according to how the value is measured or determined. As used herein, the term "about" will be understood to mean up to plus or minus 20% of the particular value, such as plus 1%, plus 5%, plus 10%, plus 15%, plus 20%, minus 1%, minus 5%, minus 10%, minus 15%, or minus 20% of the particular value. Also, when a part "includes" or "comprises" a component or a step, unless there is a particular description contrary thereto, the part can further include other components or other steps, not excluding the others.

As used herein, a value or range recited by a parameter intends to include the values and ranges intermediated to the recited value or range. It is also to be understood that the ranges in the present disclosure include the lower and the upper limits. For example, if a peptide has 12 to 50 amino acids, it is intended that all individual values, such as 12, 13, 49, 50, and sub ranges, such as 12 to 20, 20 to 30, 30 to 50, are expressly enumerated. All possible combinations of values between the lower and the upper limits are to be considered to be expressly stated in this disclosure.

The term "self-assembled" and "self-assembly" refers to a phenomenon in which the components of an object (e.g. the nanoparticle disclosed herein) organize into a functional structure as a consequence of interactions among the components themselves and without an external direction. The terms "individual", "subject", and "patient" are used interchangeably herein and refer to a warm-blooded animal that is afflicted with, suspected of having, at risk for, predisposed to, or screened for angiogenesis- or neovascularization related disorders, including actual or suspected disease. These terms include, but are not limited to, domestic animals, sports animals, primates and humans. For example, a mammal, preferably human.

The terms "treat" or "treating" as used herein mean the action taken for management and care of a disease, disorder, or condition within a subject. The term is intended to include the delaying of progression of the disease, disorder or condition, the alleviation or relief of symptoms and complications, and/or the cure or elimination of the disease, disorder or condition. The subject to be treated may be a mammal, e.g., a human.

The term "reduce," "remit," or "inhibit" means a decrease in a parameter (e.g., blood vessel formation) as detected by standard art known methods, wherein the parameter is decreased by, or at least 10%, 20%, 30%, 40%, 50%, 60%, 70%, 80%, 90%, 99% or greater relative to an untreated subject.

The term "effective" means the symptoms of a disease, disorder, or condition is ameliorated relative to an untreated subject. The amount of active compound(s) used herein to be effective for therapeutic treatment of an angiogenesis or neovascularization associated disease varies depending upon age, body weight, general health, sex, diet, time of administration, drug interaction and the severity of the condition of the subject. The attending physician or veterinarian will decide the appropriate amount and dosage regimen. Such amount is referred to as an "effective" amount. A treatment may involve more than a single administration of an effective amount of the nanoparticle provided herein or its composition to the patient if necessary or desirable.

The term "neovascularization" as used herein refers to the formation of new blood vessels. This process of generating new blood vessels can be triggered by environmental stimulus and mediated by angiogenesis and/or a pathological tissue response. For example, tissues with injuries may trigger an assembly of proangiogenic factors that stimulates the release of proteases and eventually results in the formation and the remodeling of new blood vessels. The term "angiogenesis" refers to the proliferation or the growth of new blood vessels originating from existing blood vessels. Angiogenesis can be assayed by measuring the total length of blood vessel segments per unit area, the functional vascular density (total length of perfused blood vessel per unit area), or the vessel volume density (total of blood vessel volume per unit volume of tissue).

The term "treatment" or any lingual variation thereof refers to the administering of a therapeutically effective amount of an agent of a composition of the present disclosure which is effective to ameliorate undesired symptoms associated with a disease, to prevent the manifestation of such symptoms before they occur, to slow down the progression of the disease, slow down the deterioration of symptoms, to enhance the onset of remission period, slow down the irreversible damage caused in the progressive chronic stage of the disease, to delay the onset of said progressive stage, to lessen the severity or cure the disease, to bring about rapid recovery, or to prevent the disease form occurring or a combination of two or more of the above.

The term "peptide" is used herein to designate a series of amino acid residues, connected one to the other typically by peptide bonds between the alpha-amino and carbonyl groups of the adjacent amino acids. In some embodiments, the peptides used herein are 5 to 200 amino acids in length. In some embodiments, the peptides used herein are 10 to 100 amino acids in length. In some embodiments, the peptides used herein are 12 to 50 amino acids in length, such as 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 amino acids in length.

Furthermore, the term "peptide" shall include salts of a series of amino acid residues, connected one to the other commonly by peptide bonds between the alpha-amino and carbonyl groups of the adjacent amino acids. For example, inorganic ion salts prepared from calcium, potassium, sodium, magnesium and the analogs thereof; inorganic acid salts prepared from hydrochloric acid, nitric acid, phosphoric acid, bromic acid, iodic acid, perchloric acid, tartaric acid, sulfuric acid and the analogues thereof; trifluoroacetic acid, citric acid, maleic acid, succinic acid, oxalic acid, benzoic acid, tartaric acid, fumaric acid, mandelic acid, propionic acid, citric acid, lactic acid, glycolic acid, gluconic acid, galacturonic acid; organic acid salts prepared from acid, glutamic acid, glutaric acid, glucuronic acid, aspartic acid, ascorbic acid, carbonic acid, vanillic acid, hydroiodic acid, etc.; sulfonates prepared from methanesulfonic acid, ethanesulfonic acid, benzenesulfonic acid, p-toluenesulfonic acid, naphthalenesulfonic acid and the analogues thereof amino acid salts prepared from glycine, arginine, lysine, etc.; Amine salts prepared from trimethylamine, triethylamine, ammonia, pyridine, picoline, etc. and the analogues thereof. Preferably, the salts are pharmaceutically acceptable salts of the peptides.

The term "pharmaceutically acceptable excipient" used herein refers to a substance that facilitate the administration of an active agent to and/or absorption by an individual. In some embodiments of the present disclosure, the pharmaceutical excipients include, but not limited to, fillers, binders, a preservative, polymers, solvents, antioxidants, disintegrating agents, suspending agents, wetting agents, lubricants, coatings, metals, sweeteners, flavoring agents, stabilizers, or colorants. A person ordinarily skilled in the art will appreciate that other pharmaceutical excipients are useful in the present disclosure.

The term "biocompatible" material refers to a material that does not typically induce an adverse response when administered to an individual. The adverse response includes, but not limited to, significant inflammation and/or acute rejection of the material by the immune system of the subject, for instance, via a T-cell-mediated response. In some embodiments, a biocompatible material is biodegradable. A non-limiting example of biocompatible materials is biocompatible polymers (including biocompatible copolymers).

BRIEF DESCRIPTION OF THE DRAWINGS

The present disclosure will become more readily appreciated by reference to the following descriptions in conjunction with the accompanying drawings.

FIG. 5A shows the cell counts by flow cytometry and fluorescent labeling of FITC. FIG. 5B shows a histogram graph of FITC intensities according to FIG. 5A.

FIG. 6B shows a histogram graph of number of branches according to FIG. 5A.

FIG. 7A exhibits the fluorescent levels in mice eyes, where the minimum color scale is $9.69 \times 10^8$ and the maximum color scale is $1.10 \times 10^{10}$. FIG. 7B illustrates a quantification result of the fluorescent intensities according to FIG. 7A.

FIG. 8A shows the recovery progress on the eyes of CoNV mice in each treatment group.

FIG. 8B shows a histogram graph of the blood vessel ratios in each treatment group according to FIG. 8A.

FIG. 9A demonstrates the eye images in the region of choroid and retina, where TAMRA-labeled gp91 ds-tat peptides are shown in red. FIG. 9B shows a histogram graph of fluorescent intensities according to FIG. 9A.

FIG. 10A shows the fundus photography of the mice eye 7 days before the laser treatment (−7 day), on the laser day (0 day), 7 days after the laser treatment (+7 day) and 14 days after the laser treatment (+14 day). FIG. 10B shows a histogram graph of the changes in neovascularization area after PBS and HA-NPs⁻ treatments. Standardized data based on day 0 is presented to depict the fold changes.

DETAILED DESCRIPTIONS

Figure 1A:
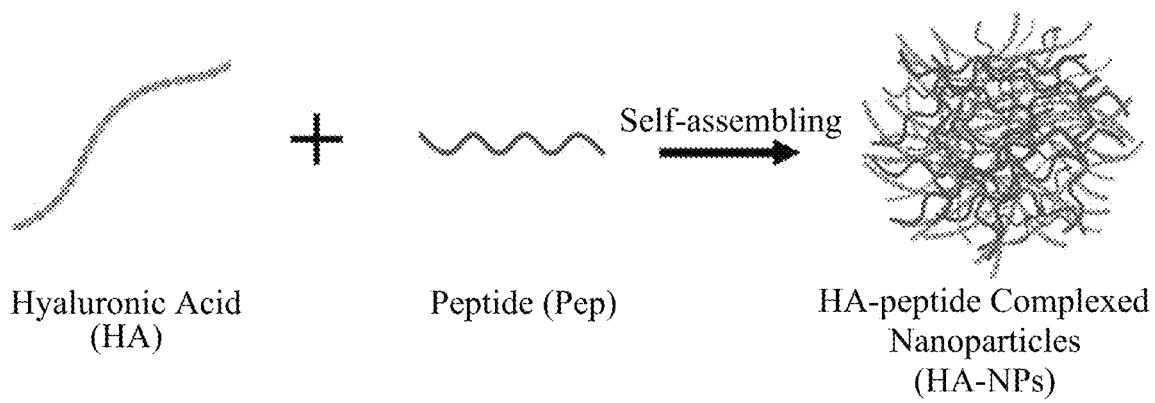
FIG. 1A shows the schematic diagram depicting the formation of the self-assembled HA-peptide complexed nanoparticles (HA-NPs)

The present invention generally features a self-assembled nanoparticle containing a hyaluronic acid (HA) and a therapeutic peptide agent in a specific ratio as well as its composition, which can be used in inhibiting new blood vessel formation. The present invention also relates to a method for treating angiogenesis or neovascularization associated diseases comprising administrating the aforementioned nanoparticle or its composition to an individual in need thereof. As described in more detail below, a known Nox2-targeted inhibitory peptide, gp91 ds-tat, combined with HA is identified to possesses the ability to suppress ocular neovascularization or angiogenesis, and also has a longer drug retention time on eye segments compared with the groups treated with either regular free gp91 peptide or PBS.

Corneal Neovascularization (CoNV)

The anterior ⅙ part of the eyeball is cornea, covering the pupil, anterior chamber and iris, it is a transparent and avascular structure. The cornea has no blood vessels in order to maintain its transparency. It mainly obtains nutrition through the vascular network at the edge of the cornea, followed by tears and aqueous humor. It obtains about 80% of oxygen directly through the air. As the cornea is in direct contact with the air, it is prone to various infections and irritation. Once the cornea is stimulated, the blood vessels of the corneal edge vascular network proliferate forward and can potentially cause corneal disease, degeneration, and even blindness if no action is taken. Causes of CoNV are various, includes but not limited to corneal immune reactions, microbial infections, bullous keratopathy, chemical injuries (alkali injuries and silver nitrate), congenital corneal lesions (Peter's anomaly), vitamin A or other vitamin and amino acid deficiencies and metabolic disturbances, wearing soft/hard contact lenses, after radial keratotomy . . . , etc.

Hypoxia may also play a role in the pathogenesis of CoNV, as neovascularization is rarely observed in the eyes of an individual who uses gas permeable lenses. Previous studies have shown that the leading factors for causing CoNV are infections, systemic diseases, chemical burns, and aniridia. By those factors above, it can be seen that corneal neovascularization is one of the most serious eye diseases in modern times.

Angiogenesis Pathways

Kim et al. (Blood. 123(5): p. 625-631, 2014) had explained the angiogenesis pathway. When NADPH oxidase activates, vascular endothelial growth factor (VEGF) stimulates the production of reactive oxygen species (ROS). Increased ROS are then involved in VEGFR2 phosphorylation which drives blood vessel proliferation (angiogenesis). NOX2, also known as gp91phox or CYBB, is the prototype NADPH oxidase. Amphioxus NOX2 might be the origin of all the mammalian NOX1/2/3. Gp91phox can severely inhibit activated oxygen to cause hypoxia. NADPH oxidase is the main source of superoxide production during hypoxia, and had been indicated that it can act on oxygen sensors activated by hypoxia in all cell types. During activation, the cytoplasmic subunits (p47phox, p67phox, p40phox, Rac1, and Rac2) of NADPH oxidase migrate to the membrane and dock with the membrane-bound subunits (gp91phox, p22phox).

Drugs for Corneal Neovascularization (CoNV)

The aim for the CoNV treatment is to achieve either anti-angiogenesis or angioregression. Non-invasive treatments such as eye drops and oral medication exhibit a poor treatment effect. Drugs for CoNV nowadays such as bevacizumab, tocilizumab, and ranibizumab mainly target to VEGF, as the inhibition of VEGF has shown significantly effective on treating CoNV. Medical treatments such as steroids, nonsteroidal anti-inflammatory agents (NSAIDs), anti-VEGF agents, and cyclosporine had present nowadays. The first line treatment for CoNV are steroids and non-steroid anti-inflammatory drugs. However, the risks for using steroids may increase the opportunity of getting infection, glaucoma, cataracts, herpes simplex recurrence and the anti-inflammatory drugs may result in corneal ulceration and melting. New treatment in recent years is anti-VEGF drugs (ranibizumab or bevacizumab) that have been shown to reduce CoNV. Vascular endothelial growth factor (VEGF) family and its receptor system has been shown to be the fundamental regulator in the cell signaling of angiogenesis. Also, many studies had shown that VEGF plays an important role in vascular angiogenesis and pathologic neovascularization associated with eye diseases, a potential treatment for CoNV is to inhibit VEGF activity by competing the binding of VEGF with specific neutralizing anti-VEGF antibody. However, anti-VEGF drugs have limitations on treating CoNV, it is not an entirely cured treatment and needs repetitive treatments to maintain positive effects over time. Although bevacizumab or ranibizumab are cancer drugs, they have been demonstrated for short-term safety and efficacy, but for long term effects haven't been recorded and possibly cause corneal thinning, decreased epithelial healing, and epithelial erosion. Anti-VEGF therapy is currently still an experimental treatment. If the cornea is inflamed via corneal neovascularization, the suppression of enzymes can block CoNV by compromising with corneal structural integrity. CoNV can also be inhibited with a combination of orally tabs of doxycycline and with topical corticosteroid.

New Anti-Angiogenetic Agent Gp91 ds-Tat Peptide

Gp91 ds-tat is a NADPH oxidase-inhibiting peptide. It is a peptide that can block the binding of p47phox and NOX2 (gp91phox) to inhibit the activation of NAD(P)H. gp91 ds-tat prevents the interaction of p47phox with Nox. Gp91 ds-tat comprises positive-charged arginine residues, making the peptide to be positively charged.

F. E. Rey at el (Circulation research 89(5): p. 408-414, 2001) had shown that gp91 peptide can inhibit the formulation of ROS and downregulate the performance of VEGF. The in vitro test indicated that $O_2^-$ value decreased, when gp91 ds-tat is administrated to an angiotensin II induced (Ang II) mice. The ability of the inhibitors to decrease vascular $O_2^-$ and blood pressure had been shown, the group with gp91 ds-tat got significantly inhibition.

T. Usui et al (Acta Physiologica 211(2): p. 385-394, 2014) also showed that gp91 ds-tat peptide may inhibit ROS. They first examined that brain-derived neurotrophic factor (BDNF) may induced ROS in human umbilical vein endothelial cells (HUVECs). After that, pre-treated HUVECs with gp91ds-tat before BDNF stimulation. The result showed that gp91 ds-tat can significantly inhibit the BDNF-induced ROS generation by the intensity of ROS signal was lower than other groups.

Hiroki Hachisuka et al (Journal of tissue engineering and regenerative medicine 2(7): p. 430-435, 2008) examined the effects of gp91 ds-tat on the growth of engineered tissue blocks, using a rat chamber model. They mixed Matrigel with gp91 ds-tat (100 µM) and compared to the control group to observed the formation of blood vessel. Although the total number of blood vessels per unit cellularized area showed no difference between two groups, most vessels in gp91 ds tat-treated tissues had smaller lumens as compared to the control (10.3±1.3% in control vs. 1.7±0.5% in gp91 ds-tat group; p<0.001). In vitro, gp91 ds-tat treatment reduced proliferation and migration of cultured microvascular endothelial cells.

Accordingly, it is believed that gp91 ds-tat peptide may contribute to the inhibition of corneal neovascularization (CoNV).

Nanomedicine for Eye Disease

The complex drug delivery barrier in the eye reduces the bioavailability of many drugs in the eye and present poor therapeutic effect. Nanocarrier-mediated drugs can interact with ocular mucosa to prolong the retention time and increase the permeability of drugs on the cornea. Also, reduce the toxicity and doses of the drugs is necessary. Thus, nanoparticle drugs had become a potential technology to produce nanomedicine and applied on ophthalmology treatment. Normally, the types of nanoparticles had been classified into nanosphere, nanocapsule, polymeric micelles, liposome, fourth generation dendrimer, ligand conjugated, and ferrofluid conjugated to ligand. The distribution of nanoparticles in the eye is mainly determined by their size and surface properties. Diameter of nanoparticles in the range of 200 to 2000 nm can stay in the eye tissue for at least 2 months and can stay in the pre-corneal tissue for a long time without being quickly removed. In polymer nanoparticles, drugs can be encapsulated, conjugated or adsorbed.

EXAMPLE

Exemplary embodiments of the present disclosure are further described in the following examples, which should not be construed to limit the scope of the present disclosure.

Figure 1B:
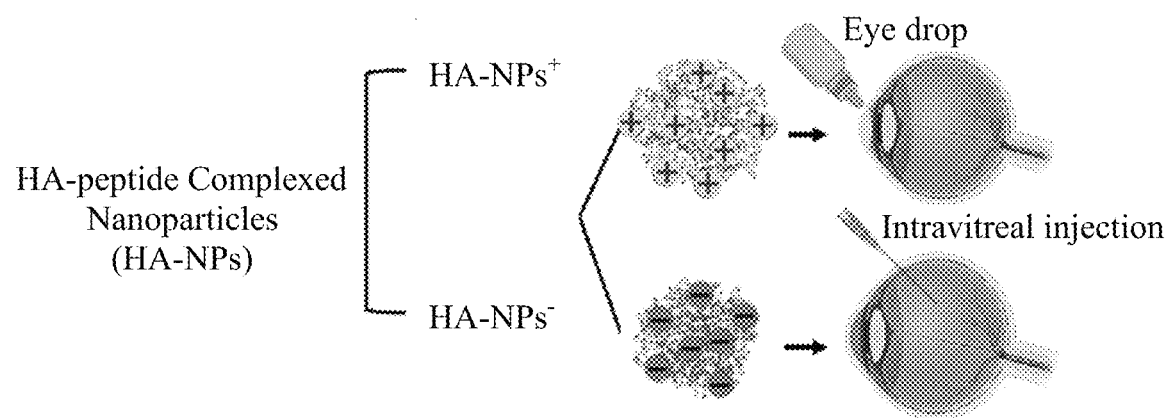
FIG. 1B shows the schematic diagram depicting the routes of administration of positively-charged HA-NPs (HA-NPs$^+$) and negatively-charged HA-NPs (HA-NPs$^-$).

As shown in FIGS. 1A and 1B, the nanoparticles provided by the present disclosure are self-assembled and complexed by hyaluronic acid (HA) and a therapeutic peptide. The HA-peptide complexed nanoparticles (HA-NPs) are colloidal, where the electric charge of the particles can be positive or negative based on the ratio between HA and the peptide. According to their electric charges, HA-NPs can be used differently. As depicted in FIG. 1B, positive-charged HA-NPs (HA-NPs$^+$) can be used in preparing eye drops, of which the eye drops can be administrated to anterior eye segments (e.g., cornea or conjunctiva). Since the cornea and conjunctiva possess negative surface charges, cationic colloidal HA-NPs can enhance the retention period and continuously exposure on the negative-charged ocular tissues. On the other hand, negative-charged HA-NPs (HA-NPs) can be administrated via intravitreal injection to the posterior eye segments (e.g., retina, choroid, and sclera) without bring a rejection incident. Since the vitreous body is composed of hyaluronic acid, HA-NPs situated at the posterior eye segments can also avoid non-absorptive clearance mechanisms.

Example 1. Synthesis and Characterization of Self-Assembled HA-NPs

In the present disclosure, gp91 ds-tat peptide (gp) was selected as the exemplary therapeutic peptide for preparing HA-NPs. Hyaluronic acid (HA) and gp solutions were prepared individually with a particular concentration of 1 to 5 mg/mL. For synthesizing the nanoparticles, 2 mL of deionized (DI) water was firstly added into a sample vial and stirred at 990 rpm. HA and gp solutions were quickly added into the sample vial with different ratios of added amount (HA:gp=1:0.5 to 2.5) to form positive charged (HA-NPs$^+$) or negative charged (HA-NPs) nanoparticles. Those nanoparticles were continuously stirred for 10 minutes, then stored at 4° C. for a further use.

The size, zeta potential, and polydispersity index (PdI) of HA-NPs$^+$ and HA-NPs$^-$ were determined using dynamic light scattering (DLS) (Zetasizer Nano ZS90; Malvern Instruments, Malvern, UK) at 25° C. Measurements were performed in triplicate for each group. To determine the peptide encapsulation efficiency (EE) of the nanoparticles, HA-NPs$^+$ and HA-NPs$^-$ were centrifuged at 4000 ref for 20 minutes in a centrifugal filter tube. Unencapsulated gp91 ds-tat peptides were collected and quantified by protein assay reagent (Bio-Rad, USA). The peptide EEs were calculated by the formula below:

$$EE(\%) = \frac{\text{Total } gp\ (\mu g) - \text{Unencapsulated } gp\ (\mu g)}{\text{Total } gp\ (\mu g)} \times 100\%$$

The results are summarized in Table 1 and 2 below. Table 1 demonstrates that the electric charge of the HA-NPs can be determined according to the ratio amounts between HA and gp within the nanoparticles. An increase of gp in the ratio would lead HA-NPs to be more positive-charged, whereas an increase of HA directs HA-NPs to be more negative-charged.

TABLE 1

Characteristics of HA-NPs with different HA:gp ratios

| Ratio (HA:gp v/v) | Size (nm) | Zeta Potential (mV) | PdI |
|---|---|---|---|
| 1:12.5 | 156.4 ± 0.7 | 19.5 ± 0.6 | 0.08 ± 0.01 |
| 1:1.67 | 268.4 ± 7.1 | 17.9 ± 0.7 | 0.08 ± 0.04 |
| 1:6.25 | 260.3 ± 7.5 | −18.7 ± 0.2 | 0.10 ± 0.06 |
| 1:0.5 | 285.4 ± 72.0 | −36.1 ± 5.9 | 0.36 ± 0.13 |

Table 2 shows the average values of the characteristics of HA-NPs$^+$ and HA-NPs$^-$. The mean particle size of HA-NPs$^+$ and HA-NPs$^-$ measured by DLS were 268.4±7.1 nm and 166.7±1.0 nm, respectively. The zeta potentials of HA-NPs$^+$ and HA-NPs$^-$ were 17.9±0.7 mV (positive) and −31.6±0.6 mV (negative). The PdI values in all tested groups were lower than 0.15, indicating these samples were well-dispersed colloidal solutions. The peptide encapsulation efficiency (EE) of HA-NPs$^+$ and HA-NPs$^-$ were around 98% and 76%, showing good encapsulations of the peptide.

TABLE 2

Average values of characteristics of HA-NPs⁺ and HA-NPs⁻

| Nanoparticles | Size (nm) | Zeta Potential (mV) | PdI | E.E. (%) |
|---|---|---|---|---|
| HA-NPs⁺ | 268.4 ± 7.1 | 17.9 ± 0.7 | 0.08 ± 0.04 | 98 ± 2.8 |
| HA-NPs⁻ | 166.7 ± 1.0 | −31.6 ± 0.6 | 0.13 ± 0.01 | 76 ± 6.9 |

Example 2. Morphology Observation of HA-NPs by Transmission Electron Microscope (TEM)

Morphologies of HA-NPs⁺ and HA-NPs⁻ were examined by transmission electron microscopy (TEM; HT-7700; Hitachi, Tokyo, Japan). Diluted HA-NPs were dropped on nickel mesh, followed by staining with 2% Uranyl acetate (UA) solution for 1 minute. The specimens were examined by TEM after drying.

Figure 2:
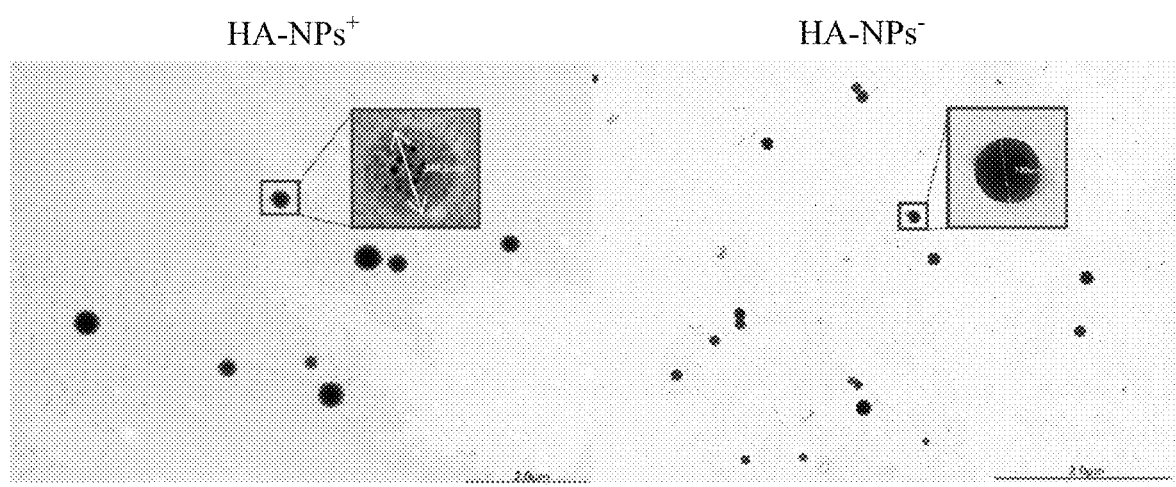
FIG. 2 illustrates the morphology of HA-NPs$^+$ and HA-NPs$^-$ under transmission electron microscopy (TEM).

Round and spherical nanoparticles were observed both in HA-NPs⁺ and HA-NPs⁻ groups from TEM images. HA-NPs were not aggregate. Particle sizes were around 248 nm (HA-NPs⁺) and 143 nm (HA-NPs⁻) (FIG. 2), which approximately matches the result of the particles size acquired from DLS measurement.

Example 3. Peptide/Drug Release Evaluation

Fluorescein isothiocyanate (FITC) was conjugated with gp91 ds-tat peptide (gp) for a fluorescent labeling. The FITC-labeled peptide was then used for preparing self-assembled HA-NPs⁺ and HA-NPs⁻ for the peptide/drug release assessment. 1 mL of FITC-labeled HA-NPs⁺, HA-NPs⁻, and free gp solutions were loaded on a dialysis membrane, respectively. Each dialysis membrane was then soaked in PBS (pH 7) in a total volume of 15 mL and was incubated in a water bath with a magnetic stirring at 37° C. At defined times (10 mins, 30 mins, 2 hrs, 4 hrs, 8 hrs, 12 hrs, 24 hrs, 48 hrs, 72 hrs), 1 mL of solution in each group was collected, and 1 mL of PBS was supplied. After all collections finished, collected samples were examined using a multifunctional microplate reader (Varioskan Flash; Thermo Fisher Scientific, USA) with an excitation wavelength of 494 nm and an emission wavelength of 518 nm to obtain the FITC concentrations. Accumulated drug release rates of FITC-labeled peptide were calculated and showed in FIG. 3.

Figure 3:
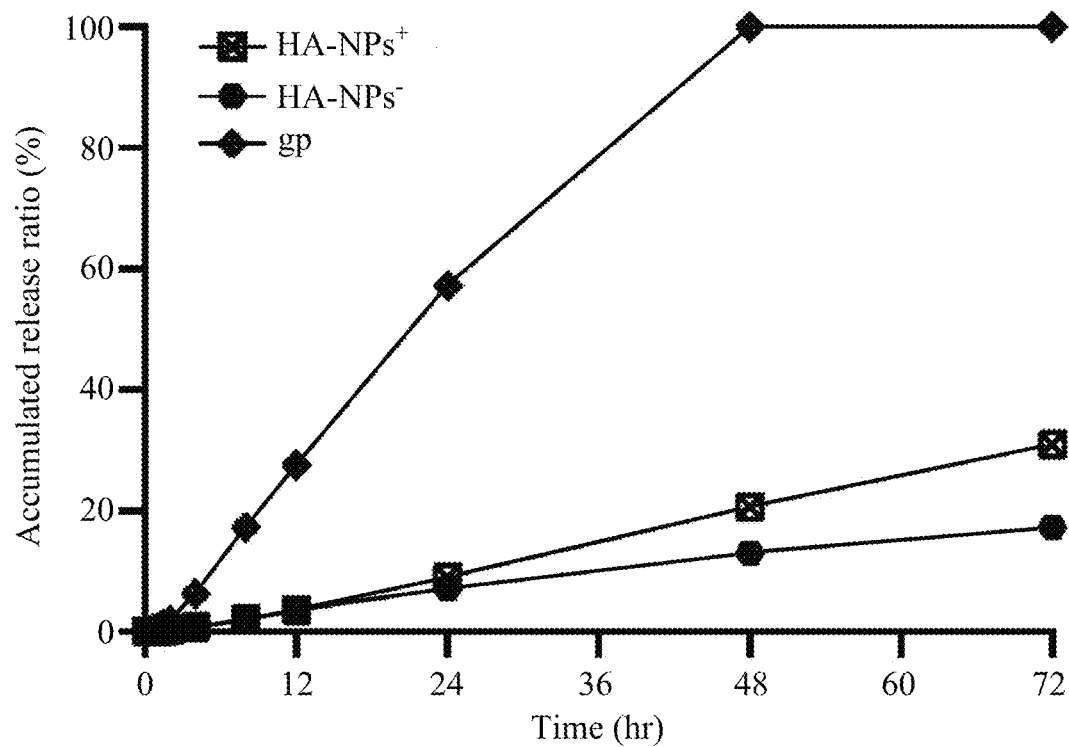
FIG. 3 shows the accumulated drug release ratios of HA-NPs$^+$, HA-NPs$^-$, and free gp91 ds-tat peptide (gp) in a neutral (pH 7) environment of phosphate buffer saline (PBS).

As shown in FIG. 3, peptides in free gp group released rapidly in the first 24 hours (57.19% of the total amount), and reach a 100% release rate in 48 hours after the assessment started. HA-NPs, however, possess explicitly slower release rates compared with that of free gp by both demonstrating low accumulated release rates of 8.9% (HA-NPs⁺) and 7.2% (HA-NPs⁻) in 24 hours after the assessment start. After 72 hours of the assessment, HA-NPs⁺ and HA-NPs⁻ reached 31.0% and 17.3% release rates, respectively. The results proved that this revealed the peptide/drug slow-release behavior when encapsulation in nanoparticles retention rate.

Example 4. Cell Viability Test

Human umbilical vein endothelial cells (HUVECs) were used for the cell viability test. The cells were seeded in 96-well plates (5×10³ cells/well) and cultured overnight. Followed by incubating with hyaluronic acid (HA), free gp91 ds-tat peptide (gp), HA-NPs⁺, and HA-NPs⁻ in a variety of concentrations for one day, respectively. Cell viability of each treatment group was determined using cell counting kit-8 (CCK-8). Culture medium from each treatment group was removed after the one day incubation and was add 110 pt of working solution of water-soluble tetrazolium 8 from the CCK-8 to each group. After 3 hours incubation, the reacted solution was examined at a wavelength of 450 nm using a microplate reader (EPOCH2; BioTek, USA). Results were presented as standardized data based on the control group (C) (FIG. 4).

Figure 4:
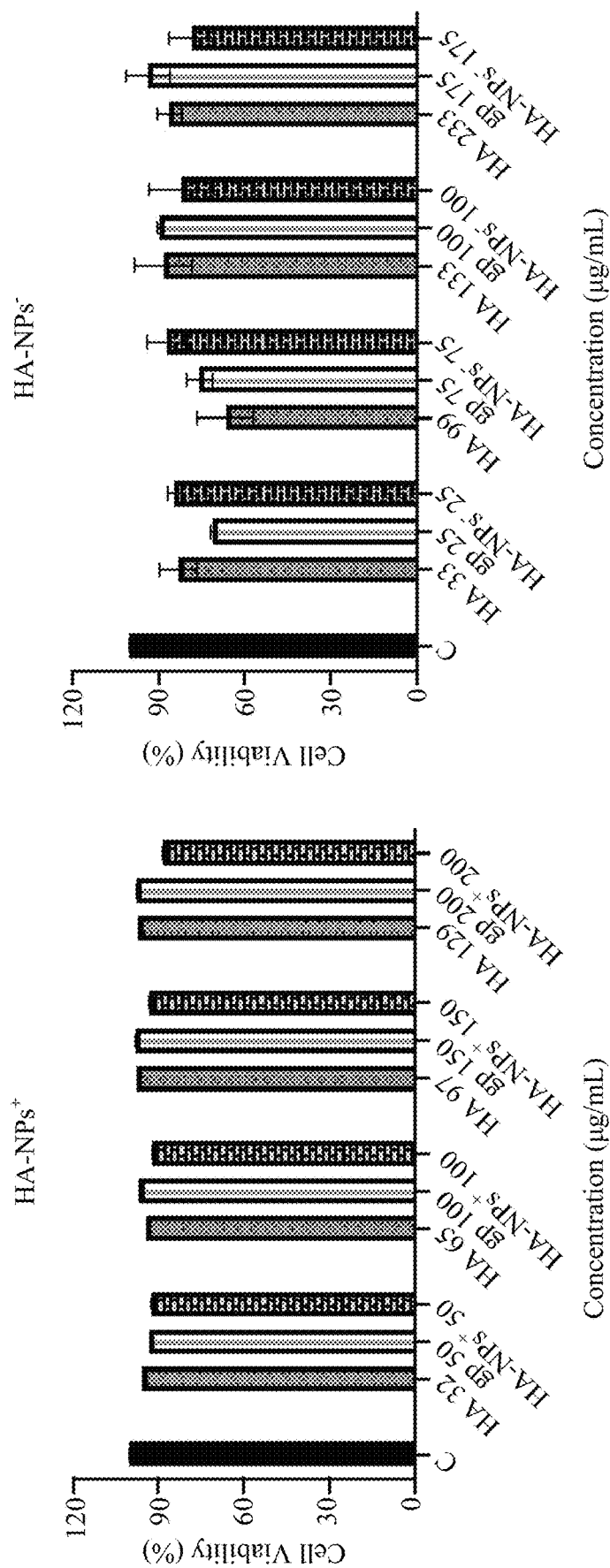
FIG. 4 shows the cell viability test results on human umbilical vein endothelial cells (HUVECs) with a 1-day treatment of hyaluronic acid (HA), free gp91 dis-tat peptide (gp), and HA-NPs in various concentrations.

As shown in FIG. 4, cell viabilities of all treatment groups were higher than 70%, indicating that no bio-toxicity was observed. HA-NPs with a low concentration (25 and 75 μg/mL) did not affect the cell viability. In addition, electric charge of HA-NPs did not influence the cell viability either. It is to be noted that treatment groups with a concentration of HA-NPs higher than 100 μg/mL exhibit lower cell viabilities than that in gp groups. The results show that HA-NPs are nontoxic to the cells.

Example 5. Cell Uptake of HA-NPs

The FITC-labeled gp91 ds-tat peptide was used to prepare HA-NPs⁺ for tracking its fluorescent signal in a flow cytometry examination. HUVEC cells were seeded in 24-well plate (2×10⁵ cell/well) for overnight. Solutions of free gp91 ds-tat peptide (gp) and HA-NPs⁺ having a peptide concentration of 300 μg/mL were added to the cells. Cells were then harvested and resuspended into single cell suspensions in PBS after 0.5 hour and 2 hours of incubation. Followed by an examination through a flow cytometer (Invitrogen Attune™ NxT Acoustic Focusing Cytometer; AFC2, Thermo, Singapore) with 1×10⁴ cells counted and analyzed by AttuneNxT software (Invitrogen Attune™ NxT Acoustic Focusing Cytometer; AFC2, Thermo, Singapore).

Figure 5A:
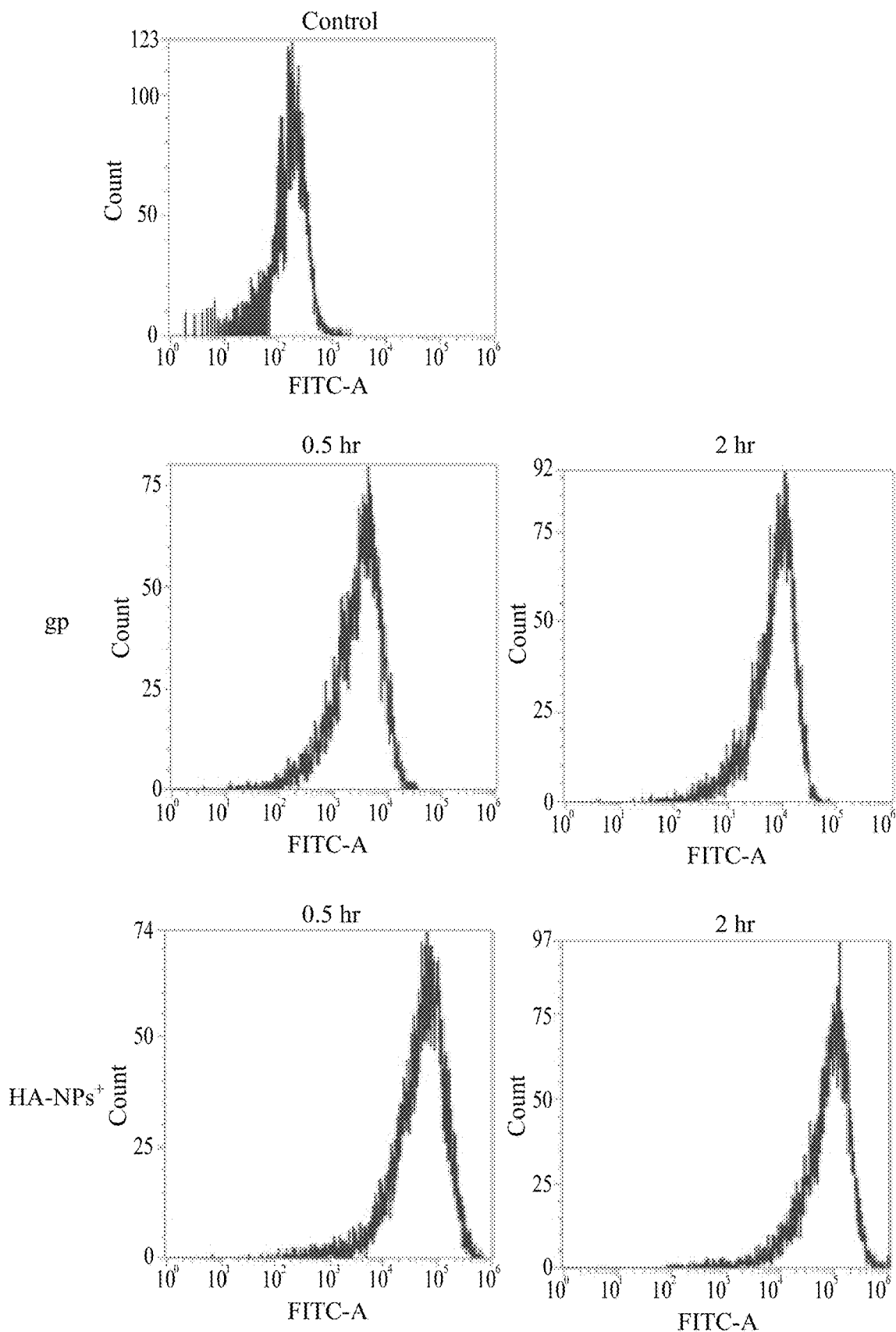
FIGS. 5A to 5B illustrate the cell uptake of free gp91 ds-tat peptide (gp) and HA-NPs$^+$ in HUVECs.
Figure 5B:
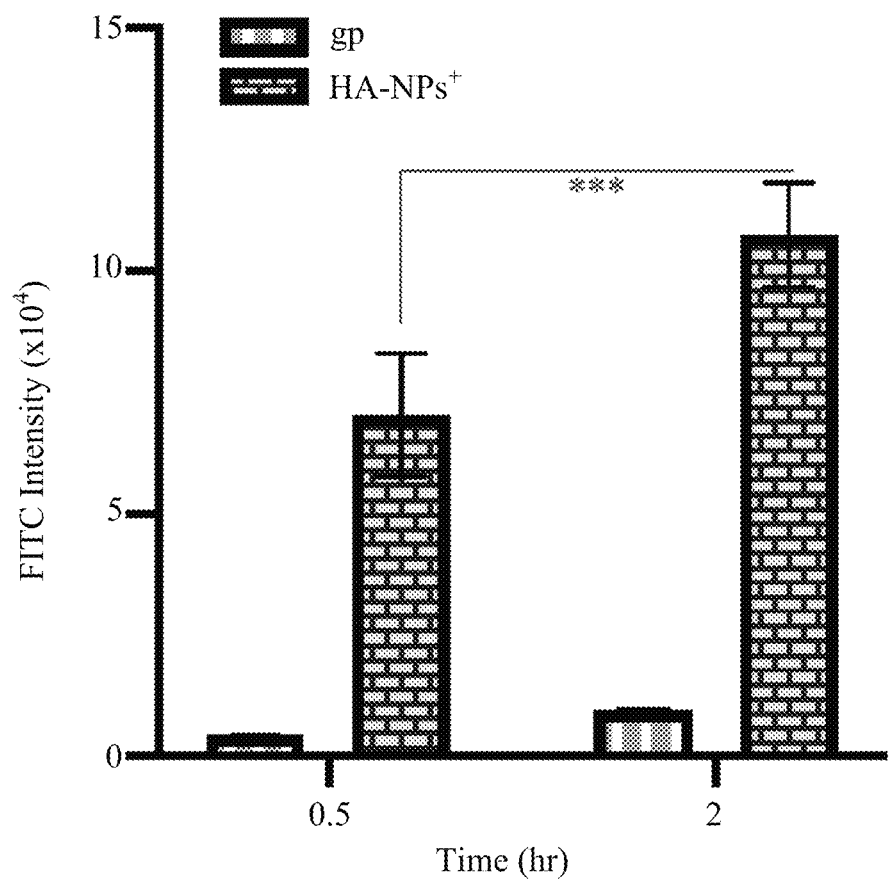

As shown in FIGS. 5A and 5B, the HA-NPs⁺ group demonstrated a clearly higher FITC intensity over the gp group at 0.5 hour of incubation. Similar results were also observed in the 2 hours incubation, a higher fluorescent intensity exhibited by HA-NP⁺ group was acquired compared with that by the gp group. The result shows that HA-NPs provided by the present disclosure can be easily up taken by cells and are capable of delivering the therapeutic peptides into cells.

Example 6. Tube Formation

To understand the anti-angiogenetic effect brought by HA-NPs and the therapeutic peptide therein, tube formation assay was performed to observe vessel network formation condition. The Matrigel™ basement membrane matrix was used to provide an environment for HUVECs to form tubes. Matrigel was coated on well (150 μL) in a 48-well plate. Thereafter, incubate these 48-well plate with Matrigel at 37° C. for 30 minutes. The HUVECs were prepared at a density of 1.5×10⁵ cells/well and treated with HA, gp, HA-NPs⁺ groups (100 μg/mL gp91 ds-tat peptide concentration) then seeded in 48-well plate. Each group was tested in three replicates and cell images were taken at 4, 16, and 24 hours by an Inverted florescent microscope (Leica DMi8, Germany). The number of branches were quantified by the software, ImageJ. The branches growth of HUVECs represent the growth of blood vessels in vitro.

Figure 6A:
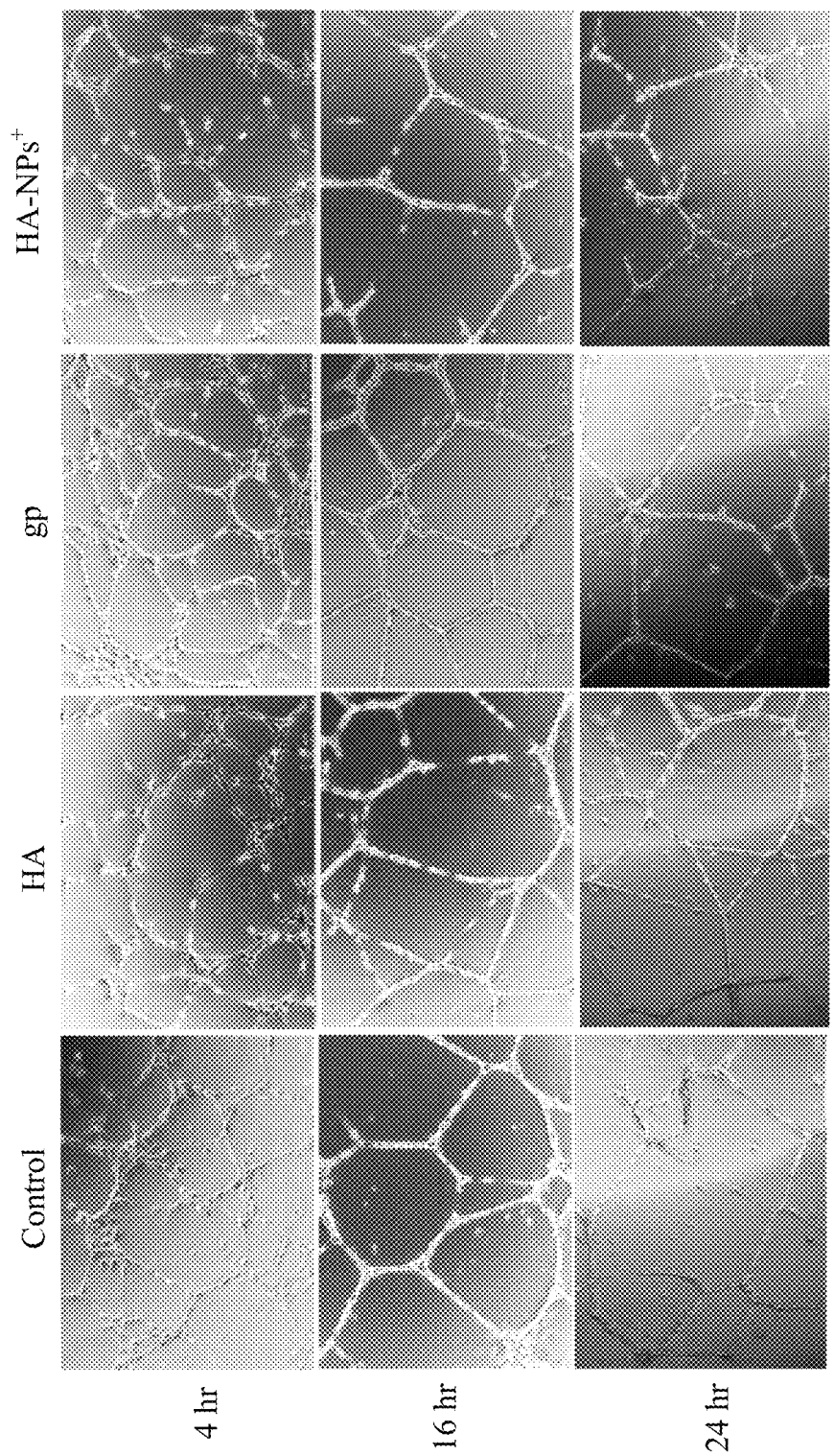
FIGS. 6A to 6B depict the results of tube formation assay on HUVECs with a treatment of hyaluronic acid (HA), free gp91 ds-tat peptide (gp), or HA-NPs$^+$ at 4 hours, 16 hours, and 24 hours after the administration.
Figure 6B:
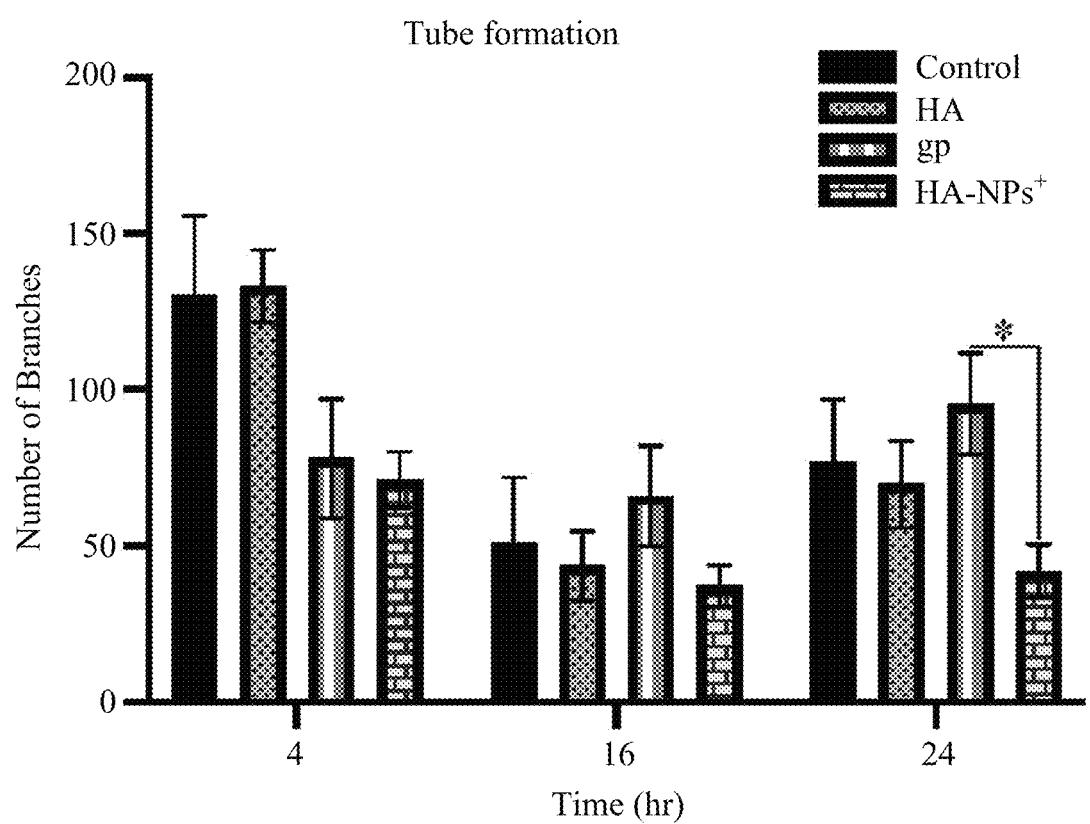

As shown in FIGS. 6A and 6B, the HA-NPs⁺ group demonstrates the lowest branch numbers at all three-time intervals among all test groups. Nevertheless, cells with HA-NPs⁺ exhibit significant lower branch numbers comparing with other groups after 24 hours of treatment. The results confirm that the nano-formulation of gp91 ds-tat peptide embedded in HA (HA-NPs$^+$) can efficiently inhibit the tube formation of HUVECs and are more effective than free-form peptide and HA. The inhibition of tube formation also implies that HA-NPs$^+$ are capable of impeding blood vessel formation in HUVECs.

Example 7. Drug Retention of HA-NPs in the Anterior Eye

Animal tests were performed on anterior and posterior eyes of mice using different routes of administration as depicted in FIG. 1B. For the test in the anterior eye, FITC-labeled gp91 ds-tat peptides were formulated with HA according to the method described above to prepare HA-NPs$^+$ eye drop. 10 µL of eye drop solutions of free gp91 ds-tat peptide (gp) and HA-NPs$^+$ with same peptide concentration were administrated to the eye of C57BL/6 mice and then monitored by an IVIS® Lumina XRMS in vivo imaging system (PerkinElmer; Waltham, MA) under anesthetization to detect the fluorescent signals on the ocular surface, respectively. The ocular fluorescence was examined at multiple time intervals (30 s, 5 min, 10 min, 30 min, 60 min).

Figure 7A:
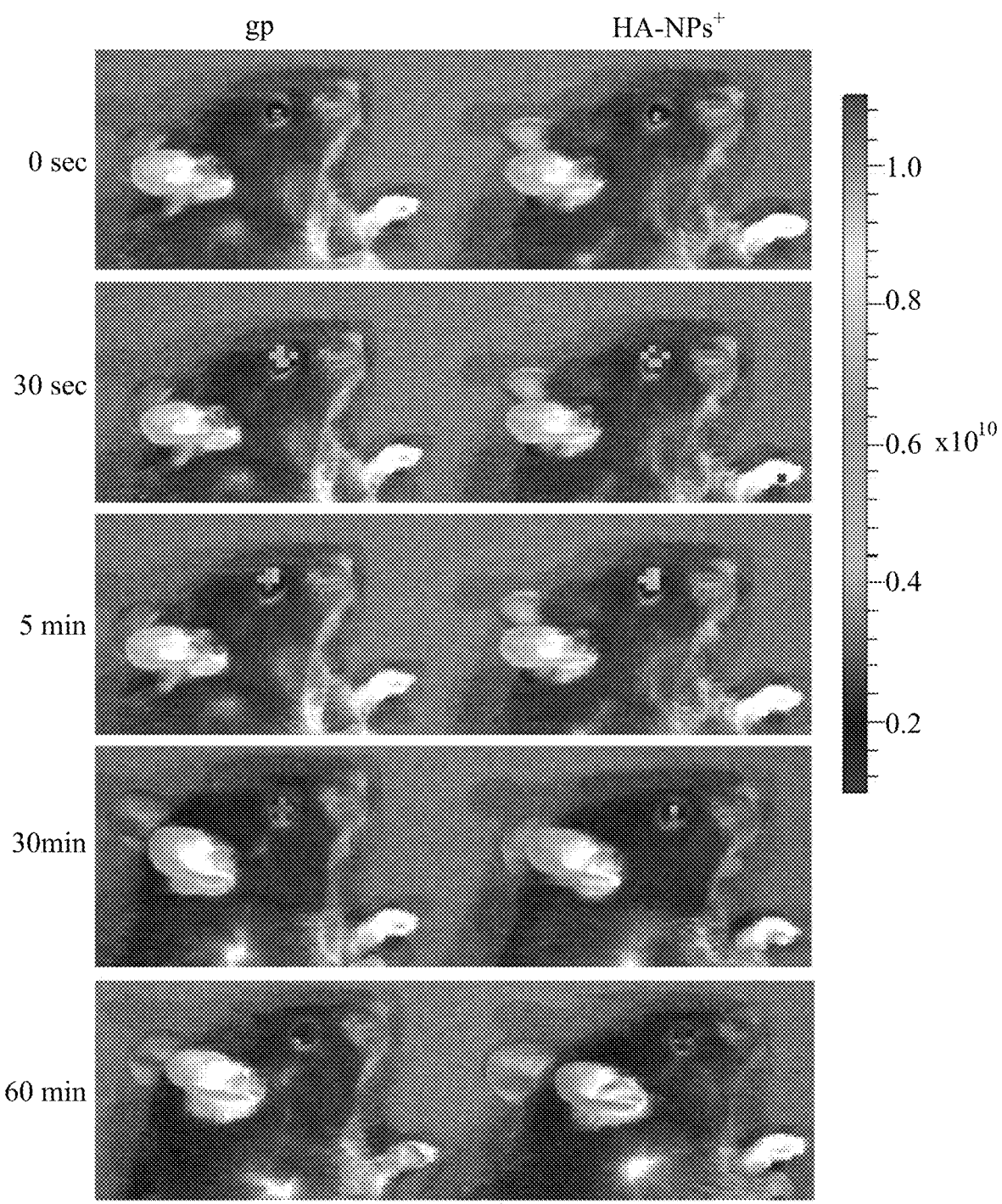
FIGS. 7A to 7B illustrate the drug retention rate of free gp91 ds-tat peptide (gp) or HA-NPs$^+$ in the anterior eye of mice over time.
Figure 7B:
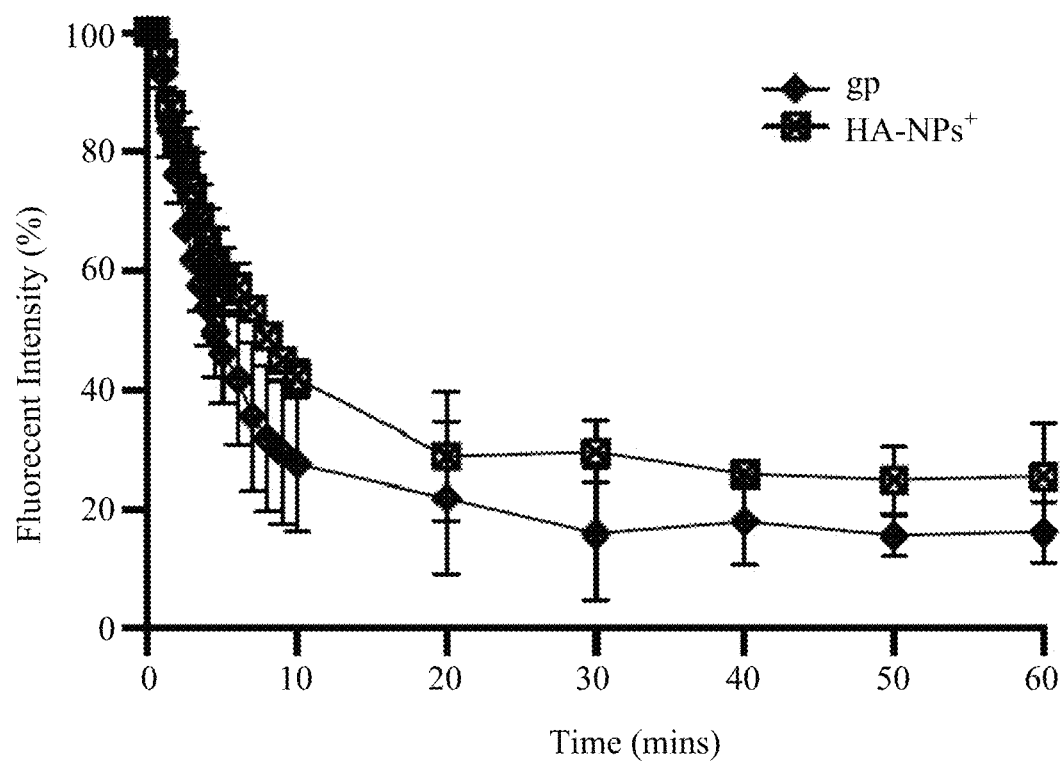

Photos of the mice eyes treated with different eye drops are shown in FIG. 7A, quantification data of fluorescent signals (FITC) is summarized in FIG. 7B. After 3 minutes of the administration, the fluorescent intensities on mice eyes were 61.8%±1.8% in gp group and 73.7%±6.1% in HA-NPs$^+$ group, indicating a longer retention time of HA-NPs$^+$ on mice eye. Similar results were also observed after longer treatment durations. HA-NPs$^+$ exhibit a clear longer-term retention rate on the anterior eye than a free peptide eye drop solution. The results show that HA-NPs can be retained at the site of action for a longer period of time and therefore offering a continuous drug release and a reduction of repetitive administrations of drugs.

Example 8. Treatment Effect of HA-NPs on Corneal Neovascularization (CoNV)

Male C57BL/6 mice (6 to 8 weeks old) were first anesthetized by interparental injection with a mixture of Zoletil 50® and Rompun®, then given local anesthesia on the eye by 0.5% Alcaine® (Alcon; Geneva, Switzerland). To create corneal neovascularization (CoNV), mice eye was suffered chemical burn on the surface of cornea using 75% silver nitrate/25% potassium nitrate stick (1590; Grafco, Australia) for eight seconds, therapeutic agents of PBS, hyaluronic acid (HA), free gp91 ds-tat peptide (gp), and HA-NPs$^+$ were administrated via eye drop with the volume of 10 µL in every two days. Each test group (PBS, HA, gp, and HA-NP$^+$) was in 6 to 8 replicates. The observation of vessels ingrowth to central cornea was observed and imaged by slit-lamp (Kowa, Japan) at day 0, 4, and 7 after the administration. To evaluate the therapeutic effect of HA-NPs$^+$ on CoNV, the vessels area of the cornea treated by different therapeutic agents were quantified by ImageJ and summarized in FIG. 8B for comparison.

Figure 8A:
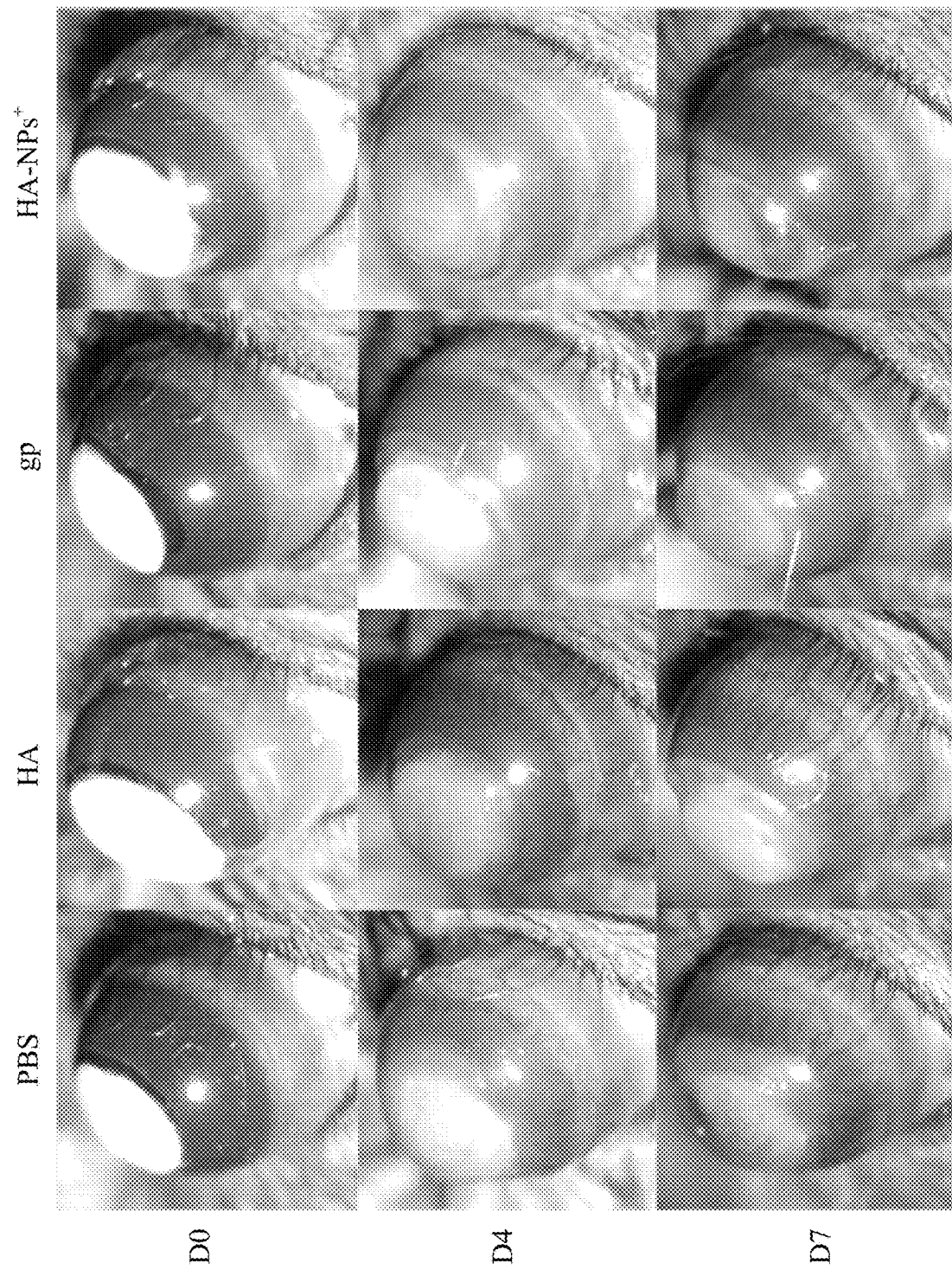
FIGS. 8A to 8B illustrate the results of corneal neovascularization (CoNV) of chemically-burned mice with treatments of PBS, hyaluronic acid (HA), free gp91 ds-tat peptide (gp), or HA-NPs$^+$.
Figure 8B:
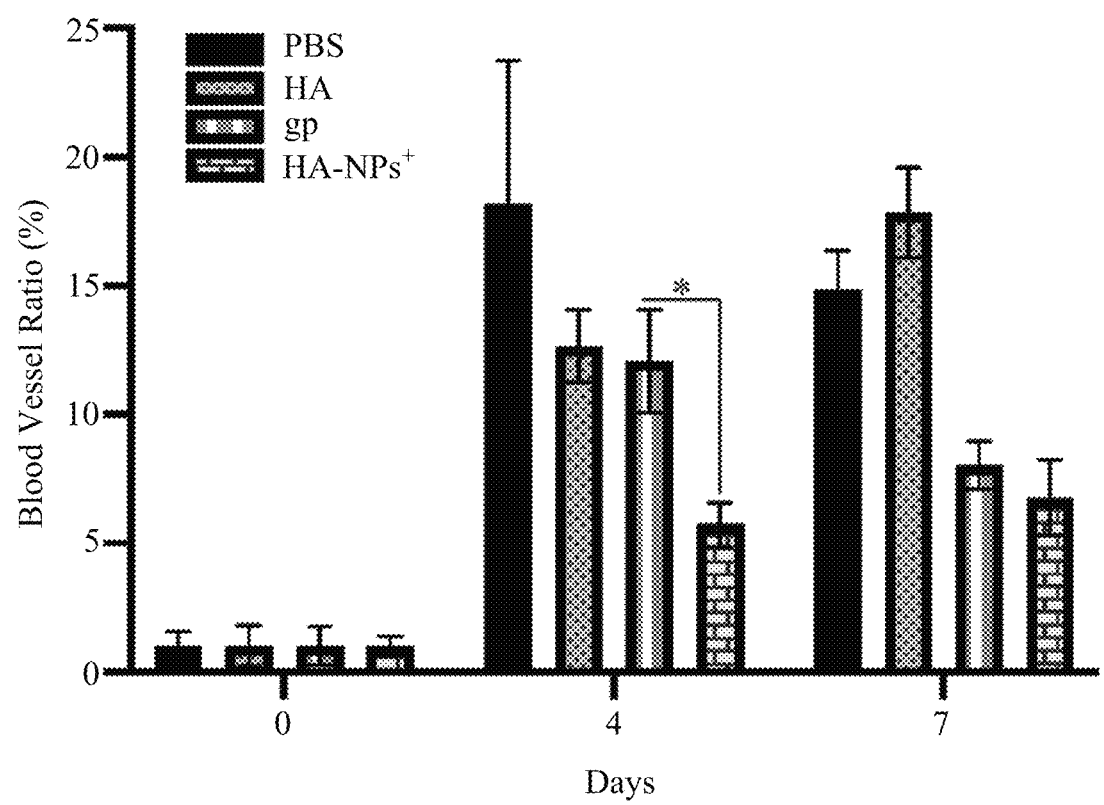

The blood vessel formatted conditions in cornea are shown in FIG. 8A, in which the PBS treated eye exhibited a serious angiogenesis condition after 4 and 7 days after administration. Fewer amount of formatted vessels in cornea were observed in the HA, gp, and HA-NPs$^+$ groups, especially in the HA-NPs$^+$ group. The comparison in FIG. 8B also illustrated that HA-NPs$^+$ brought the fastest and strongest anti-angiogenetic effect to the wound and exhibited the best effect for treating CoNV in the form of eye drop. Combing with the foregoing results described in Example 7, HA-NPs$^+$ eye drop solution can not only retain on the ocular surface for a longer exposure of the drug, but also can provide an efficient therapeutic effect on CoNV for inhibiting blood vessel formation.

Example 9. Drug Retention of HA-NPs in the Posterior Eye

Figure 9A:
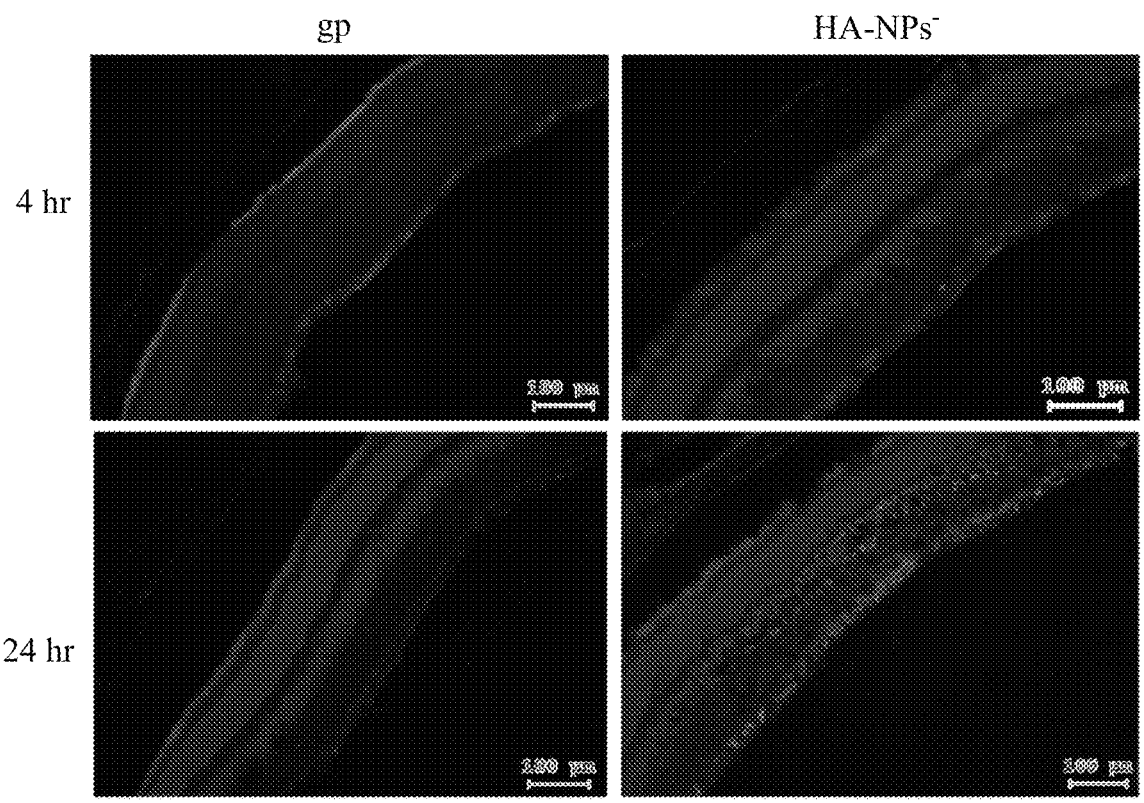
FIGS. 9A to 9B shows the results of fluorescent cryosection of mice treated with free gp91 ds-tat peptide (gp) and HA-NPs⁻.
Figure 9B:
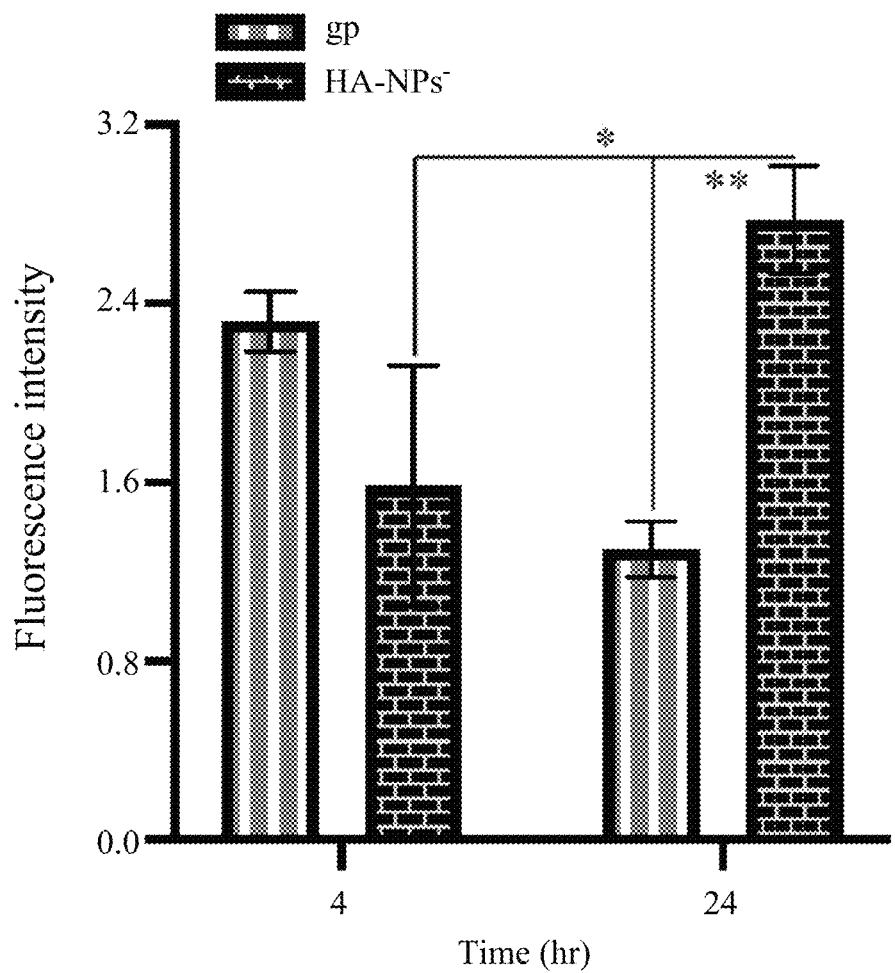

For the evaluation of drug retention of HA-NPs in the posterior eye, ((5-(6)-carboxytetramethylrhodamine succinimidyl ester (TAMRA) quencher labeled HA-NPs$^-$ were intravitreally injected to the mice eyes. The mice were sacrificed after 4 and 24 hours, in which the eyeballs were extracted out for cryosection. Slices were sectioned in 10 µm thickness by a cryostat microtome (CM 3505S, Leica, Germany) at −20° C., then attached to the positively charged glass slides (Superfrost® Plus, Thermo). And 4',6-diamidino-2-phenylindole (DAPI, 300 nM) was used for nuclear staining, then the slides were mounted. The whole eye ball cryosections were examined by Tissue FAXS (TissueGnostics, Vienna, Austria). As shown in FIG. 9A, red spots represent the localization of TAMRA-labeled free gp91 ds-tat peptide (gp) or HA-NPs$^-$.

In the gp group, strong signals were observed at the retina and choroid area at 4 hours after the administration (FIG. 1B), showing that the free gp91 ds-tat peptides quickly move from vitreous to retina and choroid. A significant drop of the fluorescent intensity was then observed after 24 hours from the administration, indicating that the free-form peptides cannot be retained on the tissues. By contrast, HA-NPs$^-$ did not exhibit a strong fluorescent intensity in the first 4 hours, yet showed a significant increase of the intensity during the 24 hours from the administration. The results illustrate that HA-NPs$^-$ given by intravitreal injection do not cause a burst drug release and can be highly retained in the posterior eye for a longer period of time comparing with the free-form peptide.

Example 10. Treatment Effect of HA-NPs on Choroidal Neovascularization (ChNV)

C57BL/6 mice were given general anesthesia as described above and given local mydriasis (Mydrin®; Shiga, Japan) before experiments. Laser photocoagulation was performed by an Imagine Guide Laser system (Phoenix Research Laboratories, Tempe, AZ, USA), then Fundus Angiography Analysis (FFA) was used to examine the choroidal neovascularization (ChNV) formation. The mice eyes were covered with 2% methodical gel (OmniVision, SA, Neuhausen, Switzerland), and fundus images and fluorescein angiography images were captured using Phoenix MICRON™ III (Phoenix Research Laboratories, Tempe, AZ, USA). The images of the posterior segment of eyes were captured by transparent light in the beginning. After that, 10% sodium fluorescein was intraperitoneally injected into the mice for fluorescein angiography. The images acquired from FFA to evaluate changes of neovascularization area were then analyzed by ImageJ. Healthy fundus profiles of mice were recorded before laser treatment for ChNV induction. Laser-induced ChNV model were generated in day 0, and then PBS/HA-NPs$^-$ were delivered via intravitreal (IV) injection at day 1. To validate the therapeutic effect, FFA was performed every week to check the angiogenesis condition for 2 weeks. The results were summarized in FIG. 10A.

Figure 10A:
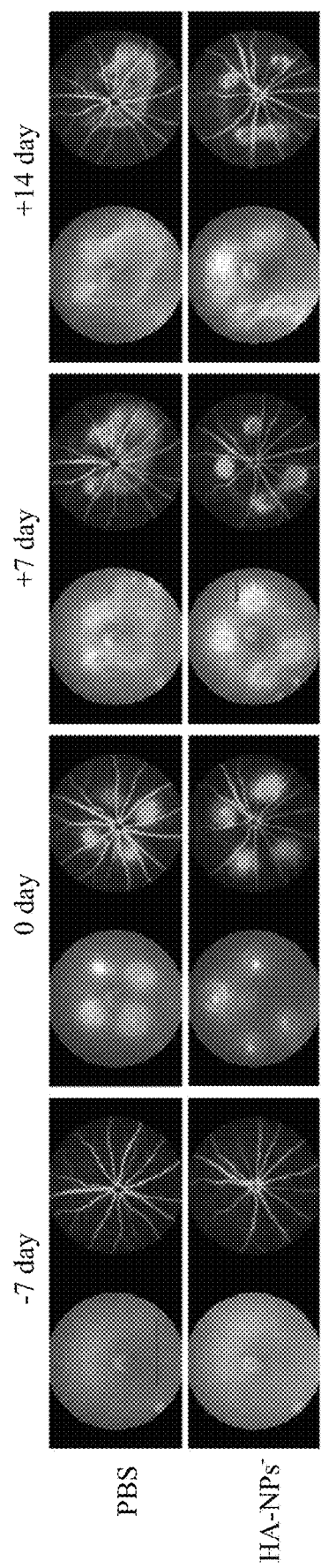
FIGS. 10A to 10B illustrate the effect of HA-NPs on treating choroidal neovascularization (ChNV).
Figure 10B:
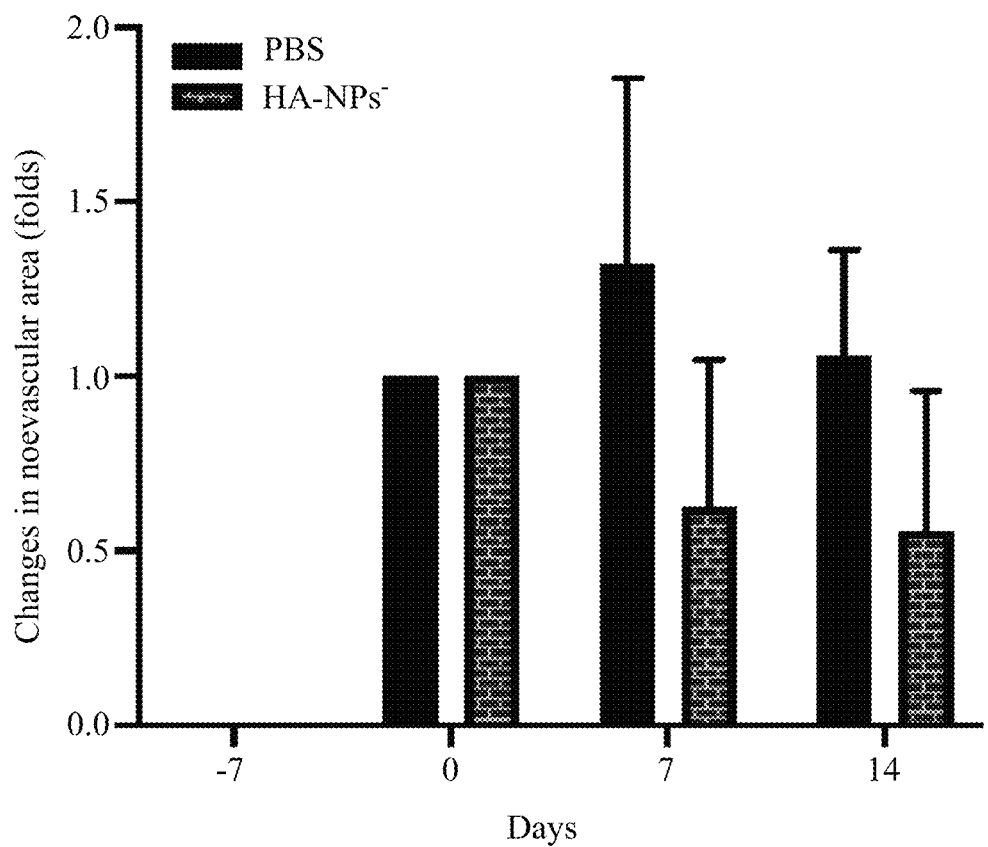

As showed in FIG. 10A, healthy and normal fundus were shown at −7 day (before laser treatment) groups. Four laser points at the day 0 were clearly observed after the laser treatments (0 day group). After IV injection of HA-NPs⁻, the fundus laser-induced area is obviously reduced than that in the PBS group. FIG. 10B demonstrates the standardized fold changes of the neovascularization area comparing to that at day 0. The PBS group exhibits an expansion of the neovascularization area at 7 and 14 days after the treatment, while the HA-NPs⁻ group clearly reduced the level of neovascularization. The results show that HA-NPs⁻ is effective in inhibiting choroidal vessel formation by reducing the neovascularization area, indicating that HA-NPs⁻ has a great potential as the anti-angiogenetic agent for application in ChNV treatment.

The present disclosure has been described with embodiments thereof, and it is understood that various modifications, without departing from the scope of the present disclosure, are in accordance with the embodiments of the present disclosure. Hence, the embodiments described are intended to cover the modifications within the scope of the present disclosure, rather than to limit the present disclosure. The scope of the claims therefore should be accorded the broadest interpretation so as to encompass all such modifications.

What is claimed is:

1. A method for inhibiting formation or growth of blood vessels, comprising:
   mixing a composition consisting of hyaluronic acid and a Nox2-targeted inhibitory peptide with water to self-assemble a hyaluronic acid-peptide complexed nanoparticle; and
   administering an effective amount of the hyaluronic acid-peptide complexed nanoparticle to an eye segment of an individual in need thereof to enhance a retention time of the Nox2-targeted inhibitory peptide at a site of action in the individual.

2. The method according to claim 1, wherein the hyaluronic acid-peptide complexed nanoparticle encapsulates at least 70% w/w of the given amount of the Nox2-targeted inhibitory peptide, the size of the hyaluronic acid-peptide complexed nanoparticle is about 100 to 400 nm, and the zeta-potential of the hyaluronic acid-peptide complexed nanoparticle is about −40 mV to 40 mV.

3. The method according to claim 1, wherein the Nox2-targeted inhibitory peptide has an antioxidant, anti-inflammatory, or anti-angiogenesis property.

4. The method according to claim 3, wherein the Nox2-targeted inhibitory peptide has an anti-angiogenesis property in vascular endothelial cells.

5. The method according to claim 1, wherein the Nox2-targeted inhibitory peptide inhibits the generation of reactive oxygen species (ROS) and therefore suppressing the expression of vascular endothelial growth factor (VEGF).

6. The method according to claim 1, wherein the Nox2-targeted inhibitory peptide is gp91 ds-tat peptide.

7. The method according to claim 1, wherein the blood vessels are ocular blood vessels.

8. The method according to claim 7, wherein the site of action is the eye segment.

9. The method according to claim 8, wherein the eye segment comprises the anterior eye segment and the posterior eye segment.

10. The method according to claim 9, wherein the anterior eye segment is cornea or conjunctiva.

11. The method according to claim 9, wherein the posterior eye segment is retina, choroid, or sclera.

12. The method according to claim 9, wherein the hyaluronic acid-peptide complexed nanoparticle is substantially positively charged and is administered via eye drops to the anterior eye segment or the posterior eye segment of an individual in need thereof.

13. The method according to claim 9, wherein the nanoparticle is substantially negatively charged and is administrated via intravitreal injection to the posterior eye segment of the individual in need thereof.

14. The method according to claim 1, wherein the individual suffers from a disorder selected from the group consisting of carcinoma, sarcoma, angiofibroma, arteriovenous malformations, atherosclerosis, hemangiomatosis, vascular adhesions, dyschondroplasia with vascular hamartomas (Maffucci's syndrome), hereditary hemorrhagic telangiectasia (Osler-Weber-Rendu disease), inflammation, and aberrant wound healing.

15. The method of claim 1, wherein the individual suffers from an ocular angiogenesis-related disorder or neovascularization-related disorder.

16. The method of claim 15, wherein the ocular angiogenesis-related disorder is selected from the group consisting of age-related macular degeneration (AMD), retinal artery or vein occlusion, branch retinal vein occlusion, retinopathy of prematurity (ROP), neovascular glaucoma, corneal neovascularization, diabetic macular edema (DME), acute idiopathic maculopathy, polypoidal choroidal vasculopathy, ischemic proliferative retinopathies, retinitis pigmentosa (RP), cone-rod dystrophy, Behcet's disease, proliferative vitreoretinopathy (PVR), retinitis, uveitis, Leber's hereditary optic neuropathy, retinal detachment, retinal pigment epithelium detachment, retinal angiogenesis and choroidal neovascularization (ChNV), posterior segment trauma, radiation retinopathy, epiretinal membrane, and anterior ischemic optic neuropathy.

* * * * *